3,389,447
OMNIDIRECTIONAL CUTTING TOOL
Elwin Theobald, 4631 Solano St., Fair Oaks, Calif. 95628, and Phillip R. Andrews, 5700 55th St., Sacramento, Calif. 95824
Filed May 26, 1967, Ser. No. 641,527
8 Claims. (Cl. 29—78)

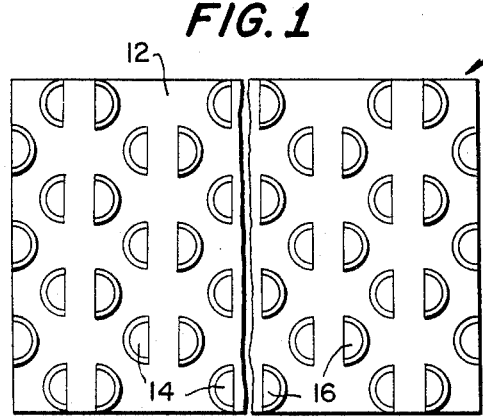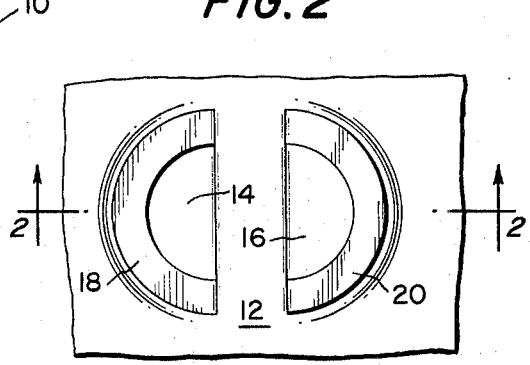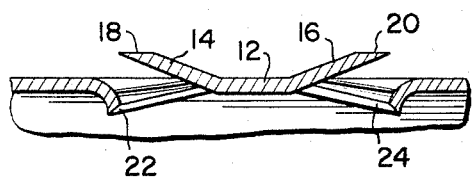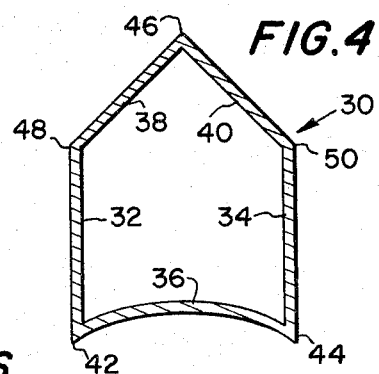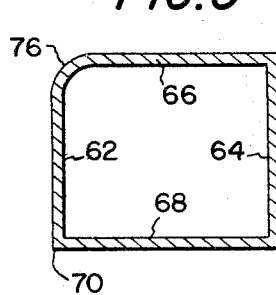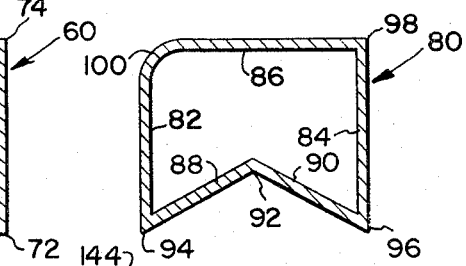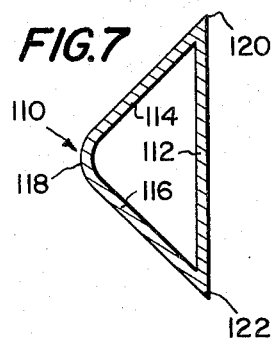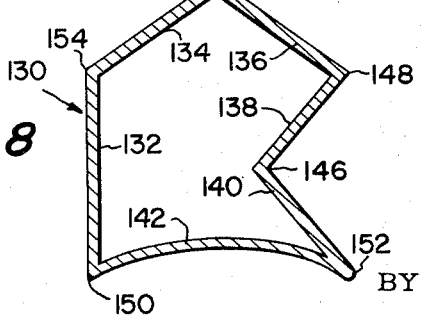
INVENTORS
ELWIN THEOBALD
PHILLIP R. ANDREWS United States Patent Office 3,389,447
Patented June 25, 1968

ABSTRACT OF THE DISCLOSURE

A cutting tool comprising a hollow member having sharpened arcuate lips extending toward the respective ends of the cutting tool and a depression for receiving material into the interior of the hollow member and hollow members of a plurality of ornamental and useful configurations are disclosed.

Background of the invention

Field of the invention.—This invention relates to cutting tools and to cutting and abrading tools of the type generally denominated as files or rasps.

Description of the prior art.—It is known in the prior art to produce cutting tools which have a member provided with a plurality of cutting teeth formed thereon and apertures through the member. Such tools are effective for cutting longitudinally but are ineffective for cutting perpendicular to the axis of the cutting tool and cut at an angle only inefficiently. Accordingly, it is the purpose and object of this invention to produce a cutting tool which will cut in all directions.

It is also known in the prior art to produce cutting tools of square or triangular configuration but it is frequently necessary or desirable to reach into obtuse, acute or rounded corners wherein such files as are known in the prior art are ineffective. Accordingly, it is a further purpose and object of this invention to provide a cutting tool of specially designed configurations which are both ornamental and utilitarian.

Summary

While not intended as a limiting statement of the invention, in the narrowest form, the invention may be regarded as an elongate hollow member of defined cross-sectional configuration having a plurality of oppositely directed cutting lips having sharpened cutting edges thereon formed from the walls of the elongate hollow members and depressions adjacent the wall portions from which the lips are formed for permitting passage of cut material from the exterior of the hollow member to the interior thereof.

The principal object of the invention is the provision of an elongate cutting tool which may cut in either direction axially of the cutting tool or transverse of the cutting tool or at any angle relative to the axis of the cutting tool.

An additional object of the invention is the provision of a novel and versatile cutting tooth arrangement for hollow cutting tools.

A further object of the invention is to provide a cutting tool having cross-sectional configurations which are both ornamental and utilitarian.

Further objects of the invention will appear from the specification which follows and from the drawings to which reference is made and such objects include the precise constructional and elemental configurations as disclosed.

Brief description of the drawing

FIGURE 1 is a view of one side of a portion of the cutting tool of this invention showing the arrangement of the cutting teeth thereon.

FIGURE 2 is a plan view of a single pair of opposed cutting edge portions shown in enlarged scale.

FIGURE 3 is a side cross-sectional view showing the arrangement of a pair of cutting edges and the wall portions of which such cutting edges are formed.

FIGURES 4, 5, 6, 7 and 8, are cross-sectional views, without a showing of the individual cutting edges, of the preferred configurational embodiments of the cutting tool of this invention.

Description of the preferred embodiments

As shown in FIGURE 1, the cutting tool of this invention 10 includes a wall portion 12 of a hollow member which will be described in greater detail hereinafter. The wall member has formed thereupon a multiplicity of cutting edges 14 faced in one direction toward a first end of the cutting tool and a multiplicity of cutting edges 16 facing in the opposite direction toward the other end of the cutting tool.

As will be apparent from FIGURE 1, in one embodiment it is desirable that the cutting edges be formed in a multiplicity of oppositely facing pairs of cutting edges and that such pairs be arranged in a plurality of staggered rows such that when moved in the longitudinal direction all portions of the surface to be cut will be contacted by a cutting edge.

As shown in FIGURE 2, an individual pair of cutting edge portions 14 and 16 include cutting edges 18 and 20 which are sharpened.

As better shown in FIGURE 3, the cutting edge portions 14 and 16 are formed from the wall portion 12 by forcing an arcuate lip upwardly or outwardly from the wall portion 12 in a first direction to form the cutting edge portion 14 and similarly forming an arcuate lip and forcing it so it extends outwardly in the other direction as shown at 16. It will be apparent that it is desirable to make the entire wall portion 12 of a hardened material or to harden the material after it has been formed to form an effective cutting tool. The sharpened cutting edges 18 and 20 may be formed either before or after hardening but it will be apparent that, in the desired embodiment, all the cutting edges such as are shown at 18 and 20 will lie in a single plane to form a smooth surface.

Difficulty is experienced with the devices of the prior art by the collection of the material which is being cut or abraded in or adjacent the cutting edge portions. This problem is obviated with respect to the present invention by the depression of lips 22 and 24 from wall member 12 to form a passageway between the lip 14 and the lip 22, for example, for the passage of the cut material from the exterior of the cutting tool to the interior thereof.

A very important facet of the invention resides in the construction of the individual teeth and the orientation thereof on a wall. As shown in FIGURES 1 and 2, by the arcuate formation of the lips sharpened cutting edges are provided for efficient cutting longitudinally of the cutting tool in both directions. In addition, it will be apparent by a reason of the arcuate shape of the cutting lips 14 and 16 that the tool will cut in angular directions other than axial of the cutting tool. In fact, the tool cuts very efficiently when moved transversely of its axis.

Situations are not uncommon wherein it is desired to form curved or cornered surfaces in materials or to clean such surfaces. Files are known in the prior art which are square or triangular but these have only limited utility. Accordingly, several configurations have been derived for providing the maximum flexibility in utilizing the cutting tool of this invention for purposes other than the cutting of smooth planar surfaces.

FIGURE 4 illustrates in cross-section the configuration of a preferred embodiment of the present cutting tool. In this embodiment five walls are joined to form a hollow member. Walls 32 and 34 are parallel to each other and are connected together at one edge by wall 36 and at the other edge by a pair of walls 38 and 40. The connection between wall 32 and wall 36 forms an outwardly acute angular cutting edge as does the joint between walls 34 and 36. It is noted that wall 36 is arcuately concave inwardly to permit the cutting of round or curved surfaces.

An outwardly right angular cutting corner is formed by the joint between walls 38 and 40 and outwardly obtuse cutting corners are formed as shown at 48 by the joint between walls 32 and 38 and as shown at 50 by the joint between walls 34 and 40.

In an alternative embodiment of the invention as shown in FIGURE 5, two parallel walls 62 and 64 and two parallel walls 66 and 68 are arranged to form a rectangle or a square and are joined, respectively, to form right angular cutting corners 70, 72 and 74, and an arcuate or curved cutting corner 76.

FIGURE 6 illustrates an alternative embodiment of the invention of FIGURES 4 or 5 and includes a pair of parallel walls 82 and 84 joined together by a perpendicular wall 86 at one end and by a pair of walls 88 and 90 which are joined at 92 to form an inwardly obtuse cutting angle and are joined to the parallel walls at 94 and 96 to form outwardly acute cutting angles. A right angular cutting angle is formed at the joint 98 and a curved corner cutting angle is formed at 100.

FIGURE 7 illustrates a triangular file 110 which includes a planar portion 112 and walls 114 and 116 joined together to form a curved cutting corner 118 and joined to the wall 112 to form sharp cutting corners at 120 and 122.

FIGURE 8 illustrates a comparatively complex embodiment of the invention 130 which includes a planar wall 132, a pair of walls 134 and 136 joined to form an outwardly obtuse cutting corner as will be described and a pair of walls 138 and 140 joined to form an inwardly obtuse cutting corner as will be described as well as an inwardly concave arcuate wall 142. Outwardly obtuse cutting corner 144, inwardly obtuse cutting corner 146 and a right angular cutting corner 148 are provided by walls 134, 136, 138 and 140, and permit the smoothing of either inside or outside corners. An acute outward cutting corner 150 is formed by the joint between wall 132 and wall 142 and a projecting rounded acute cutting corner 152 is provided by the joint between the arcuate wall 142 and wall 140. This is particularly valuable for smoothing and cleaning grooves in woodwork and the like.

It will be apparent that the embodiments disclosed provide curved, right angular, inward and outward corners for use in virtually every conceivable configuration wherein a cutting tool of this type may have applicability.

It will be apparent also that these configurations in addition to being utilitarian are highly ornamental.

Further, it will be understood that while these configurations are shown free of cutting edges for clarity of drawing they are representative and the cutting tools of which they are representative include the same configuration of cutting edges and lips as previously described with reference to FIGURES 1, 2 and 3.

While this invention has been disclosed, abstracted, and summarized with respect to specific embodiments and constructions it will be understood that departures therefrom may be made without departing from the spirit and scope of the invention which is defined and limited only by the appended claims.

We claim:
1. A cutting tool comprising:
an elongate hollow member having cutting edges formed in at least a portion of the walls thereof, said cutting edges comprising,
a first multiplicity of cutting edge portions protruding outwardly from a wall exteriorly and extending from a wall portion toward one end of the member; and
a second multiplicity of cutting edge portions protruding outwardly from the wall exteriorly and extending from said wall portion toward the other end of the member;
said cutting edge portions individually comprising,
an arcuate lip cut from the wall extending outwardly therefrom in the stated direction, and
a sharp cutting blade formed on the arcuate lip, to thereby provide sharp cutting edge portions arranged and disposed to cut toward either end of said cutting member and transversely of said cutting member for cutting in any direction.

2. The tool of claim 1 further comprising:
depressed wall portions adjacent the wall portions from which the lips are formed for permitting passage of cut material from the exterior of the cutting tool to the interior thereof.

3. The cutting tool of claim 2 wherein:
said first and second cutting edges are arranged in opposing pairs and in staggered rows of said pairs.

4. The cutting tool of claim 3 wherein:
the member is substantially square in cross-sectional configuration.

5. The tool of claim 3 wherein:
the member is substantially triangular in cross-sectional configuration.

6. The tool of claim 3 wherein:
the member includes five sides, one side being arcuately concave inwardly, two sides being substantially parallel, said parallel sides being interconnected by said arcuate side, and two sides being joined substantially at right angles to each other and being, respectively, joined to the parallel sides.

7. The tool of claim 3 wherein:
the member includes six sides arranged and connected to form inward and outward angles, two sides being joined to form an inwardly obtuse angle, one of the first named two sides and another side being joined to form an outwardly acute angle, and one side being inwardly concave, said side being joined with another side to form a sharp outwardly acute angle and with the other of said second named two sides to form a rounded outwardly acute angle.

8. The tool of claim 3 wherein:
two sides are substantially parallel;
one interconnects said parallel sides and is secured substantially perpendicularly thereto; and
two sides are joined to form an inwardly obtuse angle, said last named two sides being respectively joined to the two parallel sides to form outwardly acute angles.

References Cited
UNITED STATES PATENTS

| | | | |
|---|---|---|---|
| 1,418,974 | 6/1922 | Rowdow | 29—78 |
| 2,447,714 | 8/1948 | Richards | 146—180 |
| 2,708,376 | 5/1955 | Booth | 76—24 |
| 2,820,281 | 1/1958 | Amsen | 29—78 |
| 3,045,321 | 7/1962 | McDermott | 29—78 |

HARRISON L. HINSON, *Primary Examiner.*